United States Patent
Agiwal et al.

(10) Patent No.: US 9,172,511 B2
(45) Date of Patent: Oct. 27, 2015

(54) APPARATUS AND METHOD OF COMMUNICATING AUTOMATIC REPEAT REQUEST (ARQ) FEEDBACK IN A WIRELESS COMMUNICATION NETWORK

(75) Inventors: Anil Agiwal, Bangalore (IN); Young-Bin Chang, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 1045 days.

(21) Appl. No.: 12/977,552

(22) Filed: Dec. 23, 2010

(65) Prior Publication Data
US 2011/0161767 A1    Jun. 30, 2011

(30) Foreign Application Priority Data

Dec. 24, 2009 (IN) .......................... 3180/CHE/2009
Dec. 9, 2010 (IN) .......................... 3180/CHE/2009

(51) Int. Cl.
G06F 11/00 (2006.01)
H04L 1/16 (2006.01)
H04L 1/18 (2006.01)

(52) U.S. Cl.
CPC ............ H04L 1/1685 (2013.01); H04L 1/1835 (2013.01); H04L 1/1848 (2013.01)

(58) Field of Classification Search
CPC ... H04L 1/1685; H04L 1/1835; H04L 1/1848; H04L 1/1864
USPC ....................................................... 714/749
See application file for complete search history.

(56) References Cited

U.S. PATENT DOCUMENTS

| 7,757,148 B2 * | 7/2010 | Schaap et al. ................. 714/748 |
| 7,765,451 B2 * | 7/2010 | Yomo et al. ................... 714/749 |
| 8,245,093 B2 * | 8/2012 | Kim et al. ..................... 714/750 |
| 8,397,119 B2 * | 3/2013 | Chang et al. .................. 714/749 |

(Continued)

FOREIGN PATENT DOCUMENTS

| JP | 2009-533942 | 9/2009 |
| KR | 1020080099746 | 11/2008 |
| WO | WO 2009/046054 | 4/2009 |

OTHER PUBLICATIONS

Youngbin Chang et al., "ARQ Feedback IE Modification (Section 15.2.13.1.1)", IEEE 802.16 Broadband Wireless Access Working Group, Nov. 18, 2009.

(Continued)

*Primary Examiner* — Bryce Bonzo
*Assistant Examiner* — Elmira Mehrmanesh
(74) *Attorney, Agent, or Firm* — The Farrell Law Firm, P.C.

(57) ABSTRACT

A method and device for communicating ARQ feedback in wireless communication networks. An ARQ block whose transmission is in progress is determined upon occurrence of an event at a receiving device. ARQ feedback is generated that indicates the ARQ blocks whose transmission is in progress. Further, the ARQ feedback is sent to a device transmitting the ARQ feedback.

38 Claims, 8 Drawing Sheets

(56) References Cited

U.S. PATENT DOCUMENTS

| | | |
|---|---|---|
| 2006/0156165 A1* | 7/2006 | Kim .............................. 714/749 |
| 2007/0277072 A1 | 11/2007 | Schaap et al. |
| 2008/0109693 A1 | 5/2008 | Maas et al. |
| 2008/0117877 A1* | 5/2008 | Min et al. ...................... 370/331 |
| 2009/0024895 A1* | 1/2009 | Lin .............................. 714/749 |
| 2009/0049356 A1* | 2/2009 | Lin .............................. 714/749 |
| 2009/0094498 A1* | 4/2009 | Kim et al. ..................... 714/750 |
| 2009/0150737 A1* | 6/2009 | Wang et al. ................... 714/748 |
| 2010/0050037 A1* | 2/2010 | Chang et al. ................. 714/748 |

OTHER PUBLICATIONS

Catt, "ARQ Operation", R2-070117, 3GPP TSG-RAN WG2 #56bis, Jan. 2007.

Australian Examination Report dated Aug. 14, 2014 issued in counterpart application No. 2010335152.

Canadian Office Action dated Mar. 17, 2015 issued in counterpart application No. 2,784,985.

Japanese Notice of Patent Grant Action dated Jul. 17, 2015 issued in counterpart application No. 2012-545861, 5 pages.

\* cited by examiner

| |
|---|
| ACK TYPE FIELD : 'CUMULATIVE AND SELECTIVE ACK' (402) |
| SN FIELD (404) |
| SUSPENDED INDICATOR BIT FIELD : '0' OR '1' (406A) |
| FEEDBACK BIT FIELD (408A)<br><br>A) '1' INDICATES POSITIVE ACKNOWLEDGEMENT FEEDBACK STATE<br><br>B) '0' INDICATES NEGATIVE ACKKNOWLEDGEMENT FEEDBACK STATE IF SUSPENDED INDICATOR BIT IS SET TO '0'<br><br>C) '0' INDICATES SUSPENDED FEEDBACK STATE IF SUSPENDED INDICATOR BIT IS SET TO '1' |
| SUSPENDED INDICATOR BIT FIELD : '0' OR '1' (406B) |
| FEEDBACK BIT FIELD (408B)<br><br>A) '1' INDICATES POSITIVE ACKNOWLEDGEMENT FEEDBACK STATE<br><br>B) '0' INDICATES NEGATIVE ACKKNOWLEDGEMENT FEEDBACK STATE IF SUSPENDED INDICATOR BIT IS SET TO '0'<br><br>C) '0' INDICATES SUSPENDED FEEDBACK STATE IF SUSPENDED INDICATOR BIT IS SET TO '1' |

⋮

| |
|---|
| SUSPENDED INDICATOR BIT FIELD : '0' OR '1' (406N) |
| FEEDBACK BIT FIELD (408N)<br><br>A) '1' INDICATES POSITIVE ACKNOWLEDGEMENT FEEDBACK STATE<br><br>B) '0' INDICATES NEGATIVE ACKKNOWLEDGEMENT FEEDBACK STATE IF SUSPENDED INDICATOR BIT IS SET TO '0'<br><br>C) '0' INDICATES SUSPENDED FEEDBACK STATE IF SUSPENDED INDICATOR BIT IS SET TO '1' |

FIG.4

| |
|---|
| ACK TYPE FIELD : 'CUMULATIVE AND SELECTIVE ACK' (502) |
| SUSPENDED INDICATOR BIT FIELD : '0' OR '1' (504) |
| SN FIELD (506) |
| ONE OR MORE INSTANCE OF FOLLOWING FIELD |
| FEEDBACK BIT FIELD (508)<br><br>IF (SUSPENDED INDICATOR BIT ==0)<br>{<br>    A) ONE BIT CORRESPONDS TO ONE ARQ BLOCK<br>    B) '1' INDICATES POSITIVE ACKNOWLEDGEMENT FEEDBACK STATE<br>    C) '0' INDICATES NEGATIVE ACKKNOWLEDGEMENT FEEDBACK<br>} ELSE IF (SUSPENDED INDICATOR BIT ==1)<br>{<br>    A) TWO BITS CORRESPONDS TO ONE ARQ BLOCK<br>    B) '00' INDICATES POSITIVE ACKNOWLEDGEMENT FEEDBACK STATE<br>    C) '01' INDICATES NEGATIVE ACKNOWLEDGEMENT STATE<br>    D) '10' INDICATES SUSPENDED FEEDBACK STATE<br>    E) '11' INDICATES RESERVED BIT<br>} |

FIG.5

| ACK TYPE FIELD : 'CUMULATIVE AND SELECTIVE ACK' (602) |
|---|
| SN FIELD (604) |
| SUSPENDED INDICATOR BIT FIELD : '0' OR '1' (606A) |
| FEEDBACK BIT FIELD (608A)<br><br>IF (SUSPENDED INDICATOR BIT ==0)<br>{<br>    A) ONE BIT CORRESPONDS TO ONE ARQ BLOCK<br>    B) '1' INDICATES POSITIVE ACKNOWLEDGEMENT FEEDBACK STATE<br>    C) '0' INDICATES NEGATIVE ACKNOWLEDGEMENT FEEDBACK STATE<br><br>} ELSE IF (SUSPENDED INDICATOR BIT ==1)<br>{<br>    A) TWO BITS CORRESPONDS TO ONE ARQ BLOCK<br>    B) '00' INDICATES POSITIVE ACKNOWLEDGEMENT FEEDBACK STATE<br>    C) '01' INDICATES NEGATIVE ACKNOWLEDGEMENT STATE<br>    D) '10' INDICATES SUSPENDED FEEDBACK STATE<br>    E) '11' INDICATES RESERVED BIT<br>} |

⋮

| SUSPENDED INDICATOR BIT FIELD : '0' OR '1' (606N) |
|---|
| FEEDBACK BIT FIELD (608A)<br><br>IF (SUSPENDED INDICATOR BIT ==0)<br>{<br>    A) ONE BIT CORRESPONDS TO ONE ARQ BLOCK<br>    B) '1' INDICATES POSITIVE ACKNOWLEDGEMENT FEEDBACK STATE<br>    C) '0' INDICATES NEGATIVE ACKNOWLEDGEMENT FEEDBACK STATE<br><br>} ELSE IF (SUSPENDED INDICATOR BIT ==1)<br>{<br>    A) TWO BITS CORRESPONDS TO ONE ARQ BLOCK<br>    B) '00' INDICATES POSITIVE ACKNOWLEDGEMENT FEEDBACK STATE<br>    C) '01' INDICATES NEGATIVE ACKNOWLEDGEMENT STATE<br>    D) '10' INDICATES SUSPENDED FEEDBACK STATE<br>    E) '11' INDICATES RESERVED BIT<br>} |

FIG.6

APPARATUS AND METHOD OF COMMUNICATING AUTOMATIC REPEAT REQUEST (ARQ) FEEDBACK IN A WIRELESS COMMUNICATION NETWORK

PRIORITY

This application claims priority under 35 U.S.C. §119(a) to India Provisional Specification (PS) No. 3180/CHE/2009, which was filed in the Office of the Controller General of Patents, Designs & Trade Marks in India on Dec. 24, 2009 and to India Complete Specification (CS) No. 3180/CHE/2009, which was filed in the Office of the Controller General of Patents, Designs & Trade Marks in India on Dec. 9, 2010, the entire disclosures of which are hereby incorporated by reference.

BACKGROUND OF THE INVENTION

1. Field of the Invention

The present invention relates generally to a field of wireless communication, and more particularly, to communicating Automatic Repeat reQuest (ARQ) feedback in wireless communication networks.

2. Description of the Related Art

Typically, in a wireless communication network, ARQ blocks are exchanged between a mobile station and a base station using ARQ protocol at a Medium Access Control (MAC) layer. The ARQ blocks are exchanged between the mobile station and the base station to provide various types of services such as voice service, packet data service, etc.

In normal ARQ operation, a transmitter transmits one or more ARQ blocks to a receiver. In a DownLink (DL) connection, the base station acts as a transmitter and the mobile station acts as a receiver, whereas in an UpLink (UL) connection, the mobile station acts as a transmitter and the base station acts as a receiver. Each ARQ block is identified by a Sequence Number (SN). Typically, whenever an ARQ block is received, the receiver marks the ARQ block as successfully received. If the receiver receives an ARQ block with SN=x before receiving the ARQ block with SN=x−1, the receiver starts an ARQ error detection timer for the ARQ block with the SN=x−1. If the ARQ block with SN=x−1 is not correctly received before expiration of the ARQ error detection timer, the receiver marks the ARQ block with SN=x−1 as failed.

Accordingly, the receiver sends an ARQ feedback indicating a status of the ARQ blocks. For example, the receiver sends positive acknowledgement (ACK) feedback if an ARQ block is successfully received and negative acknowledgement (NACK) feedback if reception of an ARQ block has failed. The ACK and NACK are indicated in an ARQ feedback information element of the ARQ feedback. The receiver sends the ARQ feedback upon receiving an ARQ feedback poll from the transmitter. The transmitter sends the ARQ feedback poll requesting the ARQ feedback after transmitting a predetermined number of ARQ blocks or a predetermined number of bytes of data in multiple ARQ blocks. Also, the receiver sends the ARQ feedback when the receiver fails to receive the ARQ block, or the receiver receives a ARQ discard message from the transmitter or before purging an ARQ block.

Both the transmitter and receiver maintain a status window that is updated based on the ARQ feedback and the received ARQ blocks, respectively. The status window in the transmitter includes a first pointer and a second pointer. The first pointer points to the ARQ block with a lowest sequence number that has been transmitted but not yet positively acknowledged by the receiver. The second pointer points to the ARQ block, which is to be transmitted next by the transmitter.

Similarly, the status window in the receiver includes a first pointer and a second pointer. The first pointer points to the ARQ block with the lowest sequence number which has not yet received correctly by the receiver. The second pointer is the sequence number of a highest ARQ block that is received by the receiver plus one.

When the receiver receives the ARQ feedback poll when the ARQ error detection timer is running for the ARQ block with SN=x, the receiver cannot send the ARQ feedback for ARQ blocks with a sequence number greater than SN=x, even if successfully received, until the ARQ error detection timer expires. As a result, a significant delay is caused in sending the ARQ feedback associated with successfully received/failed ARQ blocks, and the transmitter cannot free up memory space occupied by the successfully received ARQ blocks or retransmit the failed ARQ blocks.

Further, upon transmitting the ARQ feedback poll, if the ARQ feedback is not received by the transmitter before expiration of the ARQ feedback poll retry timer, the transmitter may retry sending an ARQ feedback poll to the receiver. The ARQ feedback poll retry timer is usually set to a longer period than the ARQ error detection timer in order to receive the delayed ARQ feedback upon expiration of the ARQ error detection timer and before expiration of the ARQ feedback poll retry timer. This may increase a significant delay already caused due to the problem described above, thereby resulting in a further delayed retransmission of the ARQ feedback poll and hence, delayed ARQ feedback.

SUMMARY OF THE INVENTION

The present invention is designed to address at least the above-mentioned problems and/or disadvantages and to provide at least the advantages described below.

Accordingly, an aspect of the present invention is to provide a device and method of communicating ARQ feedback in wireless communication networks.

In accordance with an aspect of the present invention, a method of a communication device for generating ARQ feedback is provided. The method includes determining an ARQ block whose transmission is in progress from among a plurality of ARQ blocks, upon occurrence of an event at a first communication device, and generating an ARQ feedback indicating the determined ARQ block whose transmission is in progress.

In accordance with another aspect of the present invention, a non-transitory computer-readable storage medium is provided having instructions stored therein, that when executed by a first communication device, result in performing a method of generating ARQ feedback as described above.

In accordance with another aspect of the present invention, a communication device for generating ARQ feedback is provided. The communication device includes a processor, and a memory coupled to the processor. The memory includes an ARQ reception module for determining an ARQ block whose transmission is in progress from among a plurality of ARQ blocks, upon occurrence of an event at a first communication device, and for generating an ARQ feedback indicating the determined ARQ block whose the transmission is in progress.

In accordance with another aspect of the present invention, a method of a communication device for processing ARQ feedback is provided. The method includes determining feedback associated with ARQ blocks in received ARQ feedback, where the feedback associated with each of the ARQ blocks includes one of positive acknowledgement feedback, suspended feedback, and negative acknowledgement feedback.

In accordance with another aspect of the present invention, a non-transitory computer-readable storage medium is provided having instructions stored therein, that when executed by a first communication device, result in performing a method of processing ARQ feedback as described above.

In accordance with another aspect of the present invention, a communication device for processing ARQ feedback is provided. The communication device includes a processor, and a memory coupled to the processor. The memory includes an ARQ transmission module for receiving ARQ feedback from another communication device via a wireless communication network, determining feedback associated with ARQ blocks in the ARQ feedback, and processing the ARQ feedback associated with the ARQ block, based on the feedback associated with the ARQ blocks, respectively. The feedback associated with each of the ARQ blocks includes one of positive acknowledgement feedback, suspended feedback, and negative acknowledgement feedback.

Other features of different embodiments of the present invention will be apparent from the accompanying drawings and from the detailed description that follows.

BRIEF DESCRIPTION OF THE DRAWINGS

The above and other aspects, features, and advantages of certain embodiments of the present invention will be more apparent from the following description taken in conjunction with the accompanying drawings, in which:

FIG. 4 illustrates a format of ARQ feedback, according to an embodiment of the present invention;

FIG. 5 illustrates a format of ARQ feedback, according to an embodiment of the present invention;

FIG. 6 illustrates a format of ARQ feedback, according to an embodiment of the present invention;

The drawings described herein are for illustration purposes only and are not intended to limit the scope of the present disclosure in any way.

DETAILED DESCRIPTION OF EMBODIMENTS OF THE INVENTION

Various embodiments of the present invention will now be described in detail with reference to the accompanying drawings. In the following detailed description of the embodiments of the invention, reference is made to the accompanying drawings that form a part hereof, and in which are shown by way of illustration certain embodiments in which the present invention may be practiced. These embodiments are described in sufficient detail to enable those skilled in the art to practice the present invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
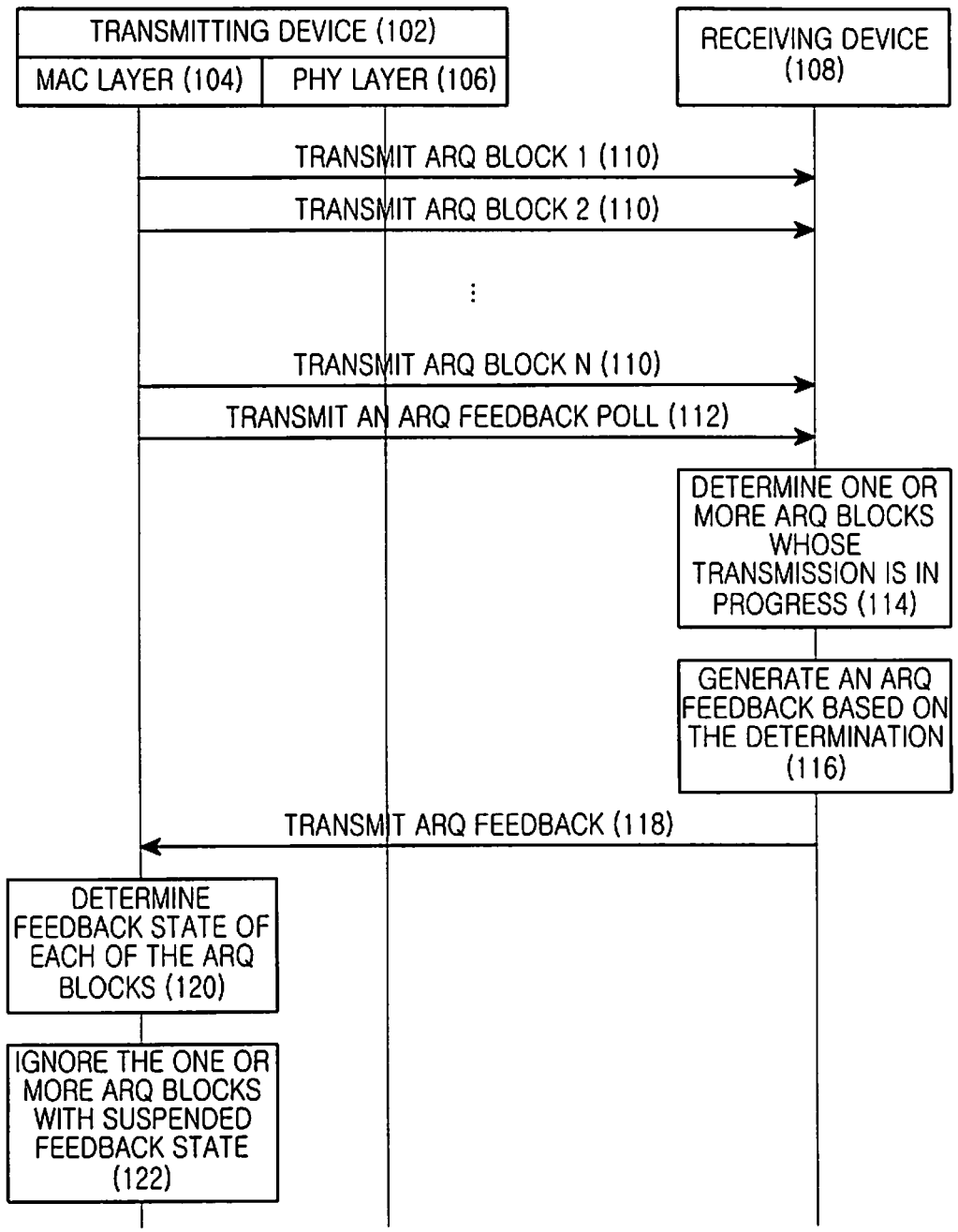
FIG. 1 is a flow diagram illustrating a method of communicating ARQ feedback between a receiving device and a transmitting device, according to an embodiment of the present invention.

FIG. 1 is a flow diagram illustrating a method of communicating ARQ feedback between a receiving device and a transmitting device, according to an embodiment of the present invention.

Referring to FIG. 1, at step 110, a transmitting device 102 including a MAC layer 104 and PHYsical (PHY) layer 106 transmits N ARQ blocks to a receiving device 108. For example, the transmitting device 102 and the receiving device 108 are communication devices such as a mobile station and base station, and the transmitting device 102 and the receiving device 108 exchange the ARQ blocks to provide a service to a user of mobile station. After transmitting N ARQ blocks to the receiving device 108, the transmitting device 102 transmits an ARQ feedback poll to determine whether the N ARQ blocks are received by the receiving device 108, at step 112.

At step 114, the receiving device 108 determines one or more ARQ blocks whose transmission is in progress when the ARQ feedback poll is received. Alternatively, the receiving device 108 may determine one or more ARQ blocks whose transmission is in progress when other types of events occur at the receiving device 108. For example, some other types of events may include failing to receive one or more ARQ blocks from the transmitting device 102, receiving an ARQ discard message from the transmitting device 102, or purging one or more ARQ blocks. In accordance with an embodiment of the present invention, the receiving device 108 determines whether an ARQ error detection timer is running for the one or more ARQ blocks in order to determine whether the transmission of the ARQ blocks is in progress.

At step 116, the receiving device 108 generates ARQ feedback based on whether the ARQ error detection timer is running. If the error detection timer is running, the receiving device 108 generates ARQ feedback indicating the ARQ blocks whose transmission is in progress, any successfully received ARQ blocks, and/or any failed ARQ blocks. Alternatively, if the error detection timer is not running, then the receiving device 108 generates ARQ feedback indicating any successfully received ARQ blocks, and/or any failed ARQ blocks.

The ARQ feedback indicates one of positive acknowledgement feedback, negative acknowledgement feedback, and suspended feedback for each ARQ block. In the ARQ feedback, an ARQ block whose transmission is in progress is indicated by the suspended feedback. Additionally, an ARQ block that is successfully received is indicated by positive acknowledgement feedback, and the ARQ block that has failed to be received is indicated by negative acknowledgement feedback. For example, each type of the feedback can be indicated by a feedback bit corresponding to an ARQ block and a suspended indicator bit, which corresponds to a group of feedback bits in the ARQ feedback.

At step 118, the receiving device 108 sends the ARQ feedback to the transmitting device 102. At step 120, the transmitting device 102 determines feedback associated with each ARQ block in the received ARQ feedback. Based on the determination, the transmitting device 102 ignores the feedback any ARQ blocks in the received ARQ feedback whose feedback is suspended feedback, at step 122. This is due to the incapability of the transmitting device 102 to act based on the suspended feedback. However, some transmitting devices 102 may have native intelligence to determine a transmission status of an ARQ block with suspended feedback and perform necessary steps, such as illustrated in FIG. 2.

Figure 2:
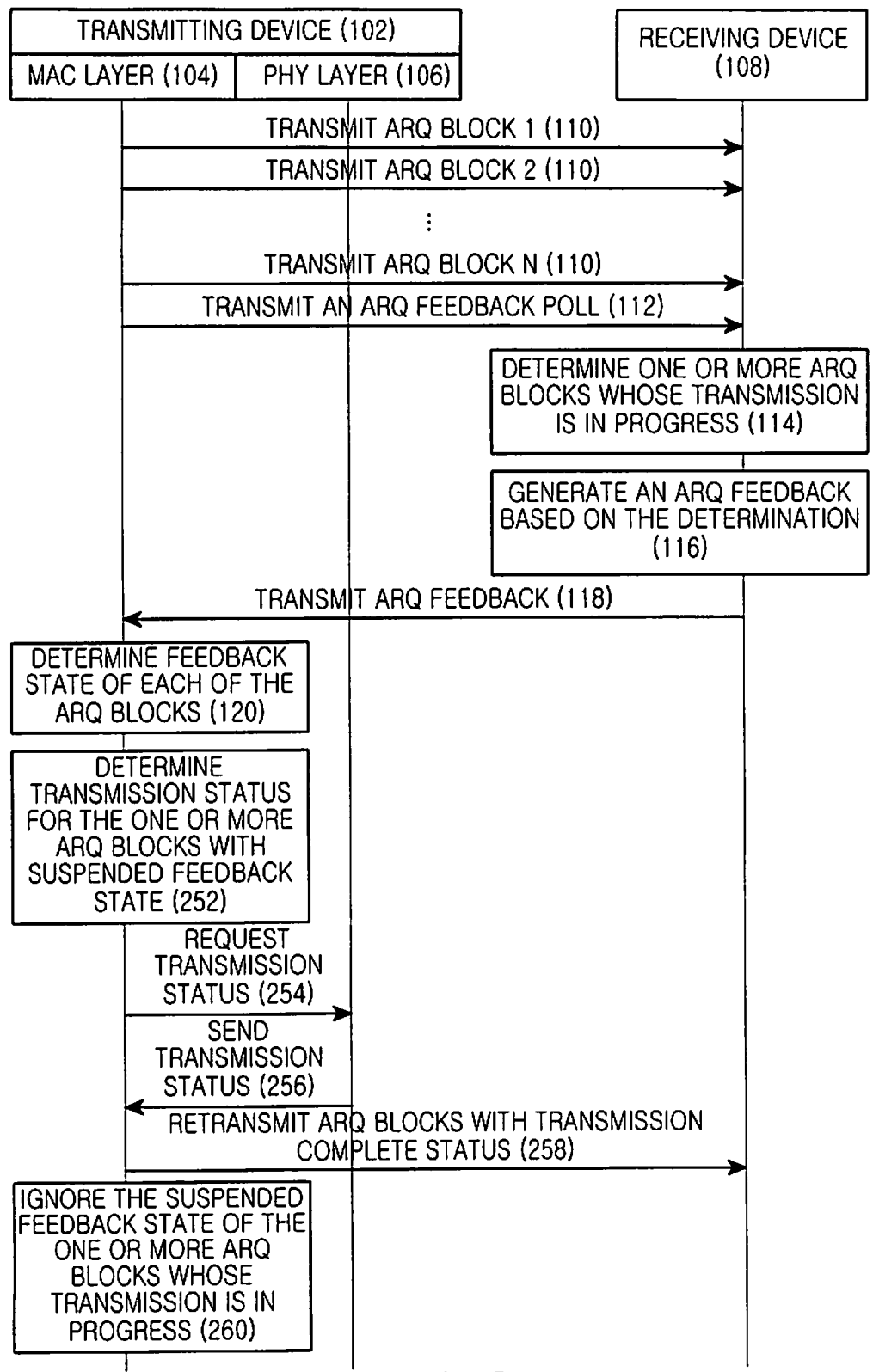
FIG. 2 is a flow diagram illustrating a method of communicating ARQ feedback between a receiving device and a transmitting device, according to an embodiment of the present invention.

FIG. 2 is a flow diagram illustrating a method of communicating ARQ feedback between a receiving device and a transmitting device, according to an embodiment of the present invention.

Referring to FIG. 2, steps 110 through 120 are the same as in FIG. 1. Accordingly, the steps will not be described again.

Additionally, FIG. 2 illustrates steps 252 to 260, which are performed by the transmitting device 102 when the feedback associated with an ARQ block is suspended feedback.

Specifically, at step 252, the transmitting device 102 determines whether transmission of the ARQ blocks associated with the suspended feedback is complete. In accordance with an embodiment of the present invention, at step 254, the MAC layer 104 of the transmitting device 102 sends a transmission status request to the PHY layer 106 of the transmitting device 102. At step 256, the PHY layer 106 sends a transmission status response indicating transmission status for the ARQ blocks.

In accordance with an embodiment of the present invention, if the transmission status response indicates that the transmission of the ARQ blocks is complete, then the transmitting device 102 retransmits the ARQ blocks to the receiving device 208, at step 258.

In accordance with another embodiment of the present invention, at step 260, the transmitting device 102 ignores the suspended feedback in the ARQ feedback, if the transmission status response indicates that the transmission of the ARQ blocks is not complete.

Figure 3:
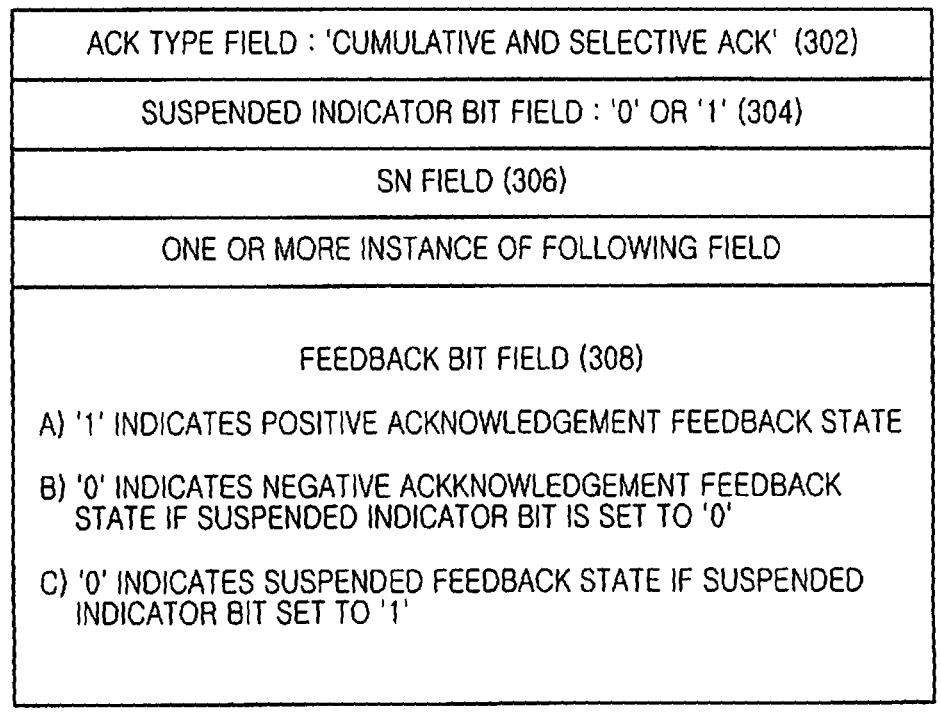
FIG. 3 illustrates a format of ARQ feedback, according to an embodiment of the present invention.

FIG. 3 illustrates a format of ARQ feedback, according to an embodiment of the present invention.

Referring to FIG. 3, the ARQ feedback includes an acknowledgement type field 302, a suspended indicator bit field 304, a sequence number field 306, and a feedback bit field 308.

The acknowledgement type field 302 indicates type of the ARQ feedback (e.g., cumulative or selective). The suspended indicator bit field 304 includes a suspended indicator bit which indicates whether feedback associated with an ARQ block is suspended feedback or not. The suspended indicator bit is defined once per ARQ feedback. The sequence number field 306 indicates a sequence number associated with the ARQ block. The feedback bit field 308 includes a group of feedback bits, each group of feedback bits indicates positive acknowledgement feedback or one of a negative acknowledgement feedback state and a suspended feedback state for each ARQ block, depending on the suspended indicator bit.

In accordance with an embodiment of the present invention, the suspended indicator bit is used to interpret feedback bits set to a value '0' in the feedback bit field 308. For example, when the suspended indicator bit is set to a value '0', then any of feedback bit set to a value '0' in the feedback bit field 308 indicates negative acknowledgement feedback for the ARQ block corresponding to the feedback bit with value '0'. When the suspended indicator bit is set to a value '1', then any feedback bit set to a value '0' in the feedback bit field 308 indicates suspended feedback for the ARQ block corresponding to the feedback bit with value '0'.

For example, when the transmitting device 102 sends an ARQ feedback poll, after transmitting eight ARQ blocks, the receiving device 108 generates ARQ feedback in response to the ARQ feedback poll. In this example, it is assumed that the ARQ error detection timer is running for an ARQ block with SN=1 and the remaining seven ARQ blocks are successfully received. Accordingly, the receiving device 108 generates ARQ feedback with the suspended indicator bit set to '1' and with the group of feedback bits set to '01111111' to indicate that the ARQ block with SN=1 is in transmission and the other seven ARQ blocks are successfully received.

Alternatively, if the ARQ error detection timer has expired for the ARQ block with the SN=1 and the remaining seven ARQ blocks are successfully received, then the receiving device 108 generates ARQ feedback with the suspended indicator bit set to '0' and with the group of feedback bits set to '01111111' to indicate that reception of the ARQ block with the SN=1 has failed and that the remaining seven ARQ blocks are successfully received.

FIG. 4 illustrates a format of ARQ feedback, according to an embodiment of the present invention.

Referring to FIG. 4, the ARQ feedback includes an acknowledgement type field 402, a sequence number field 404, suspended indicator bit fields 406A-N, and feedback bit fields 408A-N.

In the ARQ feedback, each of the suspended indicator bit fields 406A-N is defined per a feedback bit field of the feedback bit fields 408A-N to indicate suspended feedback for an ARQ block. Each of the feedback bit fields 408A-N includes a group of feedback bits, each of the group of feedback bits indicates positive acknowledgement feedback or one of negative acknowledgement feedback state and suspended feedback for each ARQ block, based on the suspended indicator bit. That is, each of the suspended indicator bit fields 406A-N is used to interpret a feedback bit set to '0' in the corresponding one of the feedback bit fields 408A-N.

For example, when the suspended indicator bit is set '0' in the suspended indicator bit fields 406A-N, then a feedback bit set to '0' in each of the corresponding feedback bit fields 408A-N indicates negative acknowledgement feedback for the ARQ block corresponding to the feedback bit set to '0'. However, when the suspended indicator bit is set to '1' in the suspended indicator bit fields 406A-N, then a feedback bit set to '0' in each of the corresponding feedback bit fields 408A-N indicates suspended feedback for the ARQ block corresponding to the feedback bit set to '0'.

FIG. 5 illustrates a format of ARQ feedback, according to an embodiment of the present invention.

Referring to FIG. 5, the ARQ feedback includes an acknowledgement type field 502, a suspended indicator bit field 504, a sequence number field 506, and a feedback bit field 508.

In the ARQ feedback, the suspended indicator bit in the suspended indicator bit field 504 is defined for each ARQ feedback to indicate suspended feedback for an ARQ block and is used to interpret feedback bits in the feedback bit field 508. For example, the suspended indicator bit set to '0' indicates that one feedback bit in the feedback bit field 508 corresponds to one ARQ block and indicates one of positive acknowledgement feedback (e.g., when the feedback bit is set to '1') and negative acknowledgment feedback (e.g., when the feedback bit is set to '0') for the ARQ block. However, when the suspended indicator bit is set to '1', it indicates that two consecutive feedback bits in the feedback bit field 508 correspond to one ARQ block and indicates one of positive acknowledgement feedback (e.g., when the feedback bits are set to '00'), negative acknowledgment feedback (e.g., when the feedback bits are set to '01'), and suspended feedback (e.g., when the feedback bits are set to '10') for the ARQ block.

FIG. 6 illustrates a format of ARQ feedback, according to an embodiment of the present invention.

Referring to FIG. 6, the ARQ feedback includes an acknowledgement type field 602, a sequence number field 604, suspended indicator bit fields 606A-N, and feedback bit fields 608A-N.

In the ARQ feedback, each of the suspended indicator bit fields 606A-N is defined for each feedback bit field of the feedback bit fields 608A-N to indicate a suspended feedback state for an ARQ block. Each of the suspended indicator bit fields 606A-N is used to interpret feedback bits in the corresponding feedback bit fields 608A-N, respectively.

For example, the suspended indicator bit set to '0' in the suspended indicator bit fields 606A-N indicates that one feedback bit in a corresponding one of the feedback bit fields 608A-N corresponds to one ARQ block and indicates one of positive acknowledgement feedback (e.g., when the feedback bit is set to '1') and a negative acknowledgment feedback (e.g., when the feedback bit is set to '0') for the ARQ block. However, when the suspended indicator bit is set to '1' in the suspended indicator bit fields 606A-N, it indicates that two consecutive feedback bits in a corresponding one of the feedback bit field 608A-N corresponds to one ARQ block and indicates one of positive acknowledgement feedback (e.g., when the feedback bits are set to '00'), negative acknowledgment feedback (e.g., when the feedback bits are set to '01'), and suspended feedback (e.g., when the feedback bits are set to '10') for the ARQ block.

Figure 7:
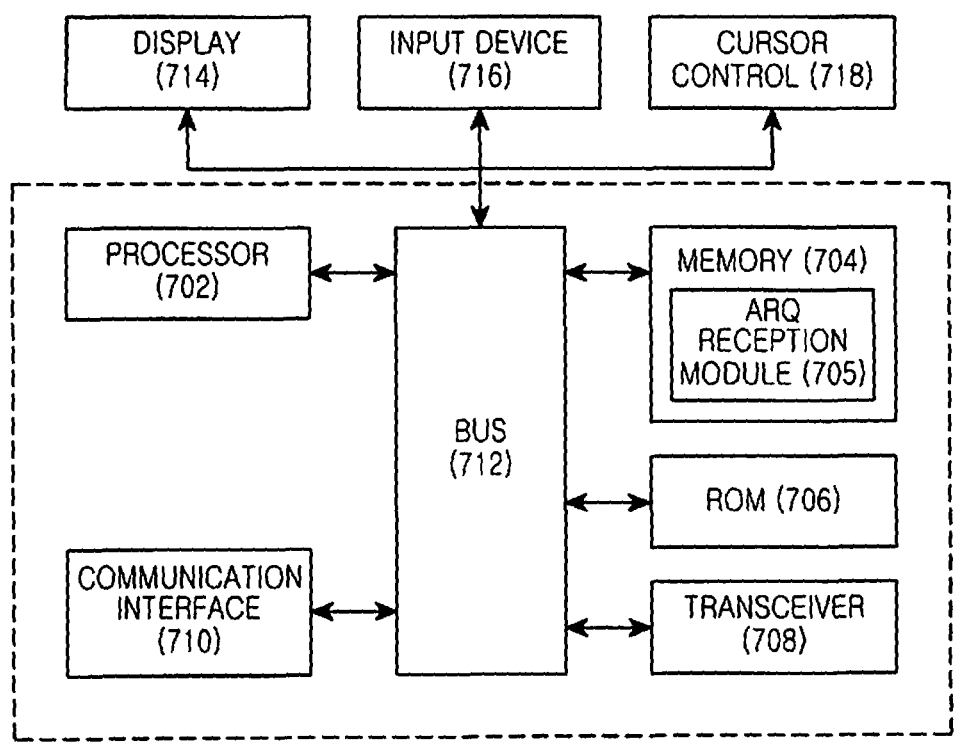
FIG. 7 is a block diagram of a receiving device according to an embodiment of the present invention.

FIG. 7 is a block diagram of a receiving device according to an embodiment of the present invention.

Referring to FIG. 7, the receiving device includes a processor 702, a memory 704, a Read Only Memory (ROM) 706, a transceiver 708, a bus 712, a communication interface 710, a display 714, an input device 716, and a cursor control 718.

The processor 702, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, etc.

The memory 704 and the ROM 706 may be volatile memory and non-volatile memory. The memory 704 includes an ARQ reception module 705 having instruction(s) for generating ARQ feedback based on a reception status of ARQ blocks according to the embodiments described above.

In accordance with an embodiment of the present invention, the ARQ reception module 705 determines whether an ARQ error detection timer is running for ARQ blocks, upon occurrence of an event to determine whether the transmission of the ARQ blocks is in progress. Further, the ARQ reception module 705 determines a sequence number associated with each of the ARQ blocks for which the ARQ error detection timer is running.

The ARQ reception module 705 then generates the ARQ feedback indicating at least one of the determined ARQ blocks whose transmission is in progress, any successfully received ARQ blocks, and any failed ARQ blocks, if the ARQ error detection timer is running. However, if the ARQ detection timer is not running, the ARQ reception module 705 generates the ARQ feedback indicating at least one of any successfully received ARQ blocks and any failed ARQ blocks.

A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, etc.

Additionally, embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 702.

For example, a computer program may include machine-readable instructions capable of generating ARQ feedback based on reception status of ARQ blocks according to the teachings and above-described embodiments of the present invention.

In accordance with an embodiment of the present invention, the program may be included on a Compact Disk-ROM (CD-ROM) and loaded from the CD-ROM to a hard drive in the non-volatile memory. The machine-readable instructions may cause the receiving device to decode according to the various embodiments of the present invention.

The transceiver 708 receives ARQ blocks and sends the ARQ feedback over a wireless communication network. The bus 712 acts as interconnect between various components of a transmitting device. The components, such as the communication interfaces 710, the display 714, the input device 716, and the cursor control 718 are well known to a person skilled in the art and hence, the explanation of these components is omitted.

Figure 8:
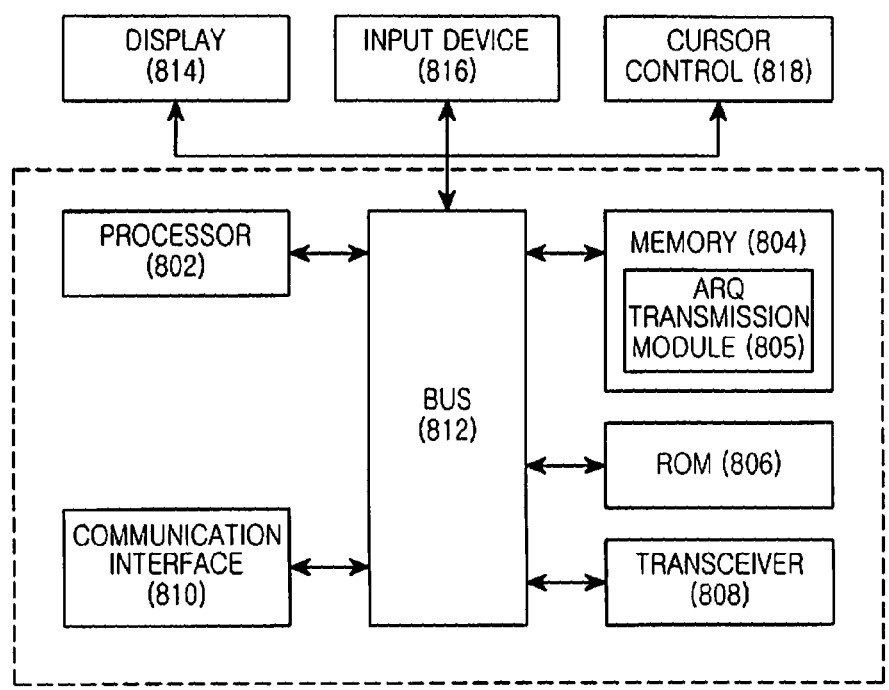
FIG. 8 is a block diagram of a transmitting device according to an embodiment of the present invention.

FIG. 8 is a block diagram of a transmitting device according to an embodiment of the present invention.

Referring to FIG. 8, the transmitting device includes a processor 802, memory 804, a ROM 806, a transceiver 808, a bus 812, a communication interface 810, a display 814, an input device 816, and a cursor control 818.

The processor 802, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, etc.

The memory 804 and the ROM 806 may be volatile memory and non-volatile memory. The memory 804 includes an ARQ transmission module 805 having instruction(s) for processing ARQ feedback received from a receiving device.

In accordance with an embodiment of the present invention, the ARQ transmission module 805 sends an ARQ feedback poll to a receiving device, and receives ARQ feedback from the receiving device via a wireless communication network. The ARQ transmission module 805 then determines whether feedback associated with ARQ blocks is suspended feedback and determines whether transmission of the ARQ blocks is complete, when the feedback is determined as suspended feedback.

If the transmission of the ARQ blocks is complete, the ARQ transmission module 805 retransmits the ARQ blocks whose transmission is complete to the receiving device Alternatively, if the transmission is not complete, the ARQ transmission module 805 ignores the suspended feedback the ARQ blocks whose transmission is not complete. If the transmitting device does not have native intelligence to perform the steps above, then the ARQ transmission module 805 ignores the suspended feedback associated with the ARQ blocks, when the feedback is determined as the suspended feedback.

A variety of computer-readable storage media may be stored in and accessed from the memory elements. Memory elements may include any suitable memory device(s) for storing data and machine-readable instructions, such as ROM, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Additionally, embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 802.

For example, a computer program may include machine-readable instructions capable of capable of processing the ARQ feedback received from the receiving device according to the teachings and above-described embodiments of the present invention.

In accordance with an embodiment of the present invention, the program may be included on a CD-ROM and loaded from the CD-ROM to a hard drive in the non-volatile memory. The machine-readable instructions may cause the transmitting device to decode according to the various embodiments of the present invention.

The transceiver 808 transmits ARQ blocks, transmits an ARQ feedback poll, and receives ARQ feedback. The bus 812 acts as interconnect between various components of the transmitting device. The components, such as the communication interfaces 810, the display 814, the input device 816, and the cursor control 818 are well known to a person skilled in the art and hence, an explanation of these components is omitted.

Further, the various devices, modules, analyzers, generators, etc., described above may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the present invention has been described above with reference to certain embodiments, it will be evident that various modifications and changes may be made to these embodiments without departing from the broader spirit and scope of the present invention as defined by the appended claims and their equivalents.

What is claimed is:

1. A method for generating Automatic Repeat reQuest (ARQ) feedback in a first communication device, the method comprising:
    determining an ARQ block whose transmission is in progress from among a plurality of ARQ blocks, upon occurrence of an event at the first communication device; and
    generating the ARQ feedback indicating that the determined ARQ block is suspended,
    wherein the ARO feedback includes a suspended indicator bit indicating that the determined ARQ block is suspended.

2. The method of claim 1, further comprising:
    sending the ARQ feedback from the first communication device to a second communication device.

3. The method of claim 1, wherein the event comprises:
    receiving, by the first communication device, an ARQ feedback poll from a second communication device.

4. The method of claim 1, wherein the event comprises:
    failing to receive, by the first communication device, at least one ARQ block from a second communication device.

5. The method of claim 1, wherein the event comprises:
    receiving, by the first communication device, an ARQ discard message from a second communication device.

6. The method of claim 1, wherein the event comprises:
    purging the ARQ block by the first communication device.

7. The method of claim 1, wherein determining the ARQ block whose transmission is in progress comprises:
    determining whether an ARQ error detection timer is running for the ARQ block, when the event has occurred;
    when the ARQ error detection timer is running, determining a sequence number associated with the ARQ block for which the ARQ error detection timer is running and generating the ARQ feedback indicating at least one of the determined ARQ block whose transmission is in progress, any successfully received ARQ blocks from among the plurality of ARQ blocks, and any failed ARQ blocks from among the plurality of ARQ blocks; and
    when the ARQ error detection timer is not running, generating the ARQ feedback indicating at least one of any successfully received ARQ blocks from among the plurality of ARQ blocks and any failed ARQ blocks from among the plurality of ARQ blocks.

8. The method of claim 1, wherein the ARQ feedback indicates feedback for each of the plurality of ARQ blocks.

9. The method of claim 8, wherein the feedback is indicated by a feedback bit corresponding to one of the plurality of ARQ blocks and the suspended indicator bit corresponding to the feedback bit.

10. The method of claim 9, wherein a value of the feedback bit associated with the one of the plurality of ARQ blocks indicates positive acknowledgement feedback or one of negative acknowledgement feedback and suspended feedback, based on a value of the suspended indicator bit.

11. The method of claim 8, wherein the feedback is indicated by one feedback bit or two feedback bits corresponding to one of the plurality of ARQ blocks and the suspended indicator bit corresponding the one feedback bit or the two feedback bits.

12. The method of claim 11, wherein a value of the suspended indicator bit indicates whether the feedback for the one of the plurality of ARQ blocks is indicated by the one feedback bit or the two feedback bits.

13. The method of claim 12, wherein a value of the two feedback bits associated with the one of the plurality of ARQ blocks indicates one of positive acknowledgement feedback, negative acknowledgement feedback, and suspended feedback.

14. The method of claim 13, wherein the positive acknowledgement feedback indicates that the one of the plurality of ARQ blocks is successfully received,
    wherein the suspended feedback indicates that the transmission of the one of the plurality of ARQ blocks is in progress, and wherein the negative acknowledgement feedback indicates that reception of the one of the plurality of ARQ blocks has failed.

15. A communication device for generating Automatic Repeat reQuest (ARQ) feedback, comprising:
a processor; and
a memory coupled to the processor,
wherein the memory includes an ARQ reception module for determining an ARQ block whose transmission is in progress from among a plurality of ARQ blocks, upon occurrence of an event at the communication device, and generating the ARQ feedback indicating that the determined ARQ block is suspended,
wherein the ARQ feedback includes a suspended indicator bit indicating that the determined ARQ block is suspended.

16. The communication device of claim 15, wherein the ARQ reception module sends the ARQ feedback to another communication device.

17. The communication device of claim 15, wherein the event comprises:
receiving, by the communication device, an ARQ feedback poll from another communication device.

18. The communication device of claim 15, wherein the event comprises:
failing to receive, by the communication device, an ARQ block from another communication device.

19. The communication device of claim 15, wherein the event comprises:
receiving, by the communication device, an ARQ discard message from another communication device.

20. The communication device of claim 15, wherein the event comprises:
purging the ARQ block by the communication device.

21. The communication device of claim 15, wherein the ARQ reception module determines the ARQ block whose transmission is in progress by determining whether an ARQ error detection timer is running for the ARQ block, when the event has occurred,
when the ARQ error detection timer is running, determining a sequence number associated with the ARQ block for which the ARQ error detection timer is running and generating the ARQ feedback indicating at least one of the determined ARQ block whose transmission is in progress, any successfully received ARQ blocks from among the plurality of ARQ blocks, and any failed ARQ blocks from among the plurality of ARQ blocks, and
when the ARQ error detection timer is not running, generating the ARQ feedback indicating at least one of any successfully received ARQ blocks from among the plurality of ARQ blocks and any failed ARQ blocks from among the plurality of ARQ blocks.

22. The communication device of claim 15, wherein the ARQ feedback indicates feedback for each of the plurality of ARQ blocks.

23. The communication device of claim 22, wherein the feedback is indicated by a feedback bit corresponding to one of the plurality of ARQ blocks and the suspended indicator bit corresponding to the feedback bit.

24. The communication device of claim 23, wherein a value of the feedback bit associated with the one of the plurality of ARQ blocks indicates positive acknowledgement feedback or one of negative acknowledgement feedback and suspended feedback, based on a value of the suspended indicator bit.

25. The communication device of claim 22, wherein the feedback is indicated by one feedback bit or two feedback bits corresponding to the one of the plurality of ARQ blocks and a suspended indicator bit corresponding to of the one feedback bit or the two feedback bits.

26. The communication device of claim 25, wherein a value of the suspended indicator bit indicates whether the feedback for the one of the plurality of ARQ blocks is indicated by the one feedback bit or the two feedback bits.

27. The communication device of claim 26, wherein a value of the two feedback bits associated with the one of the plurality of ARQ blocks indicates one of positive acknowledgement feedback, negative acknowledgement feedback, and suspended feedback.

28. The communication device of claim 27, wherein the positive acknowledgement feedback indicates that the one of the plurality of ARQ blocks is successfully received,
wherein the suspended feedback indicates that transmission of the one of the plurality of ARQ blocks is in progress, and
wherein the negative acknowledgement feedback indicates that reception of the one of the plurality of ARQ blocks has failed.

29. A non-transitory computer-readable storage medium having instructions stored therein, that when executed by a communication device, result in performing a method of generating Automatic Repeat reQuest (ARQ) feedback, comprising:
determining an ARQ block whose transmission is in progress from among a plurality of ARQ blocks, upon occurrence of an event at the communication device; and
generating the ARQ feedback indicating that the determined ARQ block is suspended,
wherein the ARO feedback includes a suspended indicator bit indicating that the determined ARO block is suspended.

30. A method for processing Automatic Repeat reQuest (ARQ) feedback in a communication device, the method comprising:
receiving the ARQ feedback from another communication device via a wireless communication network;
determining feedback associated with ARQ blocks in the received ARQ feedback, wherein the feedback associated with each of the ARQ block includes at least suspended feedback indicating that the each of the ARQ blocks is suspended; and
processing the ARQ feedback associated with the ARQ blocks based on the feedback associated with each of the ARQ blocks, respectively,
wherein the ARQ feedback includes a suspended indicator bit indicating that an ARQ block whose transmission is in progress from among the ARO blocks is suspended.

31. The method of claim 30, wherein processing the ARQ feedback associated with the ARQ blocks comprises:
determining whether the feedback associated with the ARQ blocks is the suspended feedback;
determining whether transmission of the ARQ blocks is complete, when the feedback is determined as the suspended feedback;
retransmitting any ARQ blocks whose transmission is complete to the another communication device; and
ignoring the suspended feedback of the ARQ blocks whose transmission is not complete.

32. The method of claim 30, wherein processing the ARQ feedback associated with the ARQ blocks comprises:
determining whether the feedback associated with the ARQ blocks is the suspended feedback; and ignoring the suspended feedback associated with any ARQ blocks when the feedback is determined as the suspended feedback.

33. The method of claim 30, wherein receiving the ARQ feedback from the another communication device via the wireless communication network comprises:
sending an ARQ feedback poll to the another communication device; and
receiving the ARQ feedback from the another communication device via the wireless communication network in response to the ARQ feedback poll.

34. A communication device for processing Automatic Repeat reQuest (ARQ) feedback, comprising:
a processor;
a memory coupled to the processor,
wherein the memory includes an ARQ transmission module for receiving the ARQ feedback from another communication device via a wireless communication network, determining feedback associated with ARQ blocks in the ARQ feedback, and processing the ARQ feedback associated with the ARQ blocks based on the feedback associated with each of the ARQ blocks, respectively, and
wherein the feedback associated with each of the ARQ blocks includes at least suspended feedback indicating that the each of the ARQ blocks is suspended,
wherein the ARQ feedback includes a suspended indicator bit indicating that an ARQ block whose transmission is in progress from among the ARQ blocks is suspended.

35. The communication device of claim 34, wherein the ARQ transmission module processes the ARQ feedback associated with the ARQ blocks by determining whether the feedback associated with the ARQ blocks is the suspended feedback, determining whether transmission of the ARQ blocks is complete, when the feedback is determined as the suspended feedback, retransmitting any ARQ blocks whose transmission is complete to the another communication device, and ignoring the suspended feedback of any ARQ blocks whose transmission is not complete.

36. The communication device of claim 34, wherein the ARQ transmission module processes the ARQ feedback associated with the ARQ blocks by determining whether the feedback associated with the ARQ blocks is the suspended feedback, and ignores the suspended feedback associated with the ARQ blocks when the feedback is determined as the suspended feedback.

37. The communication device of claim 34, wherein in receiving the ARQ feedback from the another communication device via the wireless communication network, the ARQ transmission module sends an ARQ feedback poll, and receives the ARQ feedback from the another communication device via the wireless communication network, in response to the ARQ feedback poll.

38. A non-transitory computer-readable storage medium having instructions stored therein, that when executed by a communication device, result in performing a method of processing Automatic Repeat reQuest (ARQ) feedback, comprising:
receiving the ARQ feedback from another communication device via a wireless communication network;
determining feedback associated with ARQ blocks in the ARQ feedback, wherein the feedback associated with each of the ARQ block includes at least suspended feedback indicating that the each of the ARQ blocks is suspended; and
processing the ARQ feedback associated with the ARQ blocks based on the feedback associated with each of the ARQ blocks, respectively,
wherein the ARQ feedback includes a suspended indicator bit indicating that an ARQ block whose transmission is in progress from among the ARO blocks is suspended.

* * * * *